United States Patent
Hosoya et al.

[11] Patent Number: 6,042,200
[45] Date of Patent: Mar. 28, 2000

[54] HYDRAULIC BRAKE CONTROL DEVICE

[75] Inventors: Yukio Hosoya; Shintaro Kawaishi, both of Hamakita, Japan

[73] Assignee: Nisshinbo Industries Inc., Tokyo, Japan

[21] Appl. No.: 09/085,166

[22] Filed: May 28, 1998

[30] Foreign Application Priority Data

Jun. 3, 1997 [JP] Japan .................................. 9-160600

[51] Int. Cl.[7] ............................................... B60T 13/66
[52] U.S. Cl. .................................. 303/119.3; 303/116.4; 303/113.1
[58] Field of Search .................. 303/113.1, 115.1, 303/115.4, 116.4, 119.1, 119.2, DIG. 10; 137/596.17, 884, 886

[56] References Cited

U.S. PATENT DOCUMENTS

| | | | |
|---|---|---|---|
| 5,482,362 | 1/1996 | Robinson | 303/119.2 |
| 5,529,389 | 6/1996 | Sekiguchi | 303/113.1 |
| 5,593,216 | 1/1997 | Hosoya et al. | 303/113.1 |
| 5,607,207 | 3/1997 | Nagashima et al. | 303/113.1 |
| 5,658,056 | 8/1997 | Rischen et al. | 303/113.1 |
| 5,836,354 | 11/1998 | Amano et al. | 303/119.2 |
| 5,921,639 | 7/1999 | Hosoya | 303/113.1 |
| 5,975,653 | 11/1999 | Zaviska | 303/119.2 |

*Primary Examiner*—Chris Schwartz
*Attorney, Agent, or Firm*—Arent Fox Kintner Plotkin & Kahn

[57] ABSTRACT

A hydraulic brake control device with an effective ease of assembly. The housing of the hydraulic control unit 40 is formed in L-shape when cross-sectioned. The vertical part 41 of the hydraulic control unit 40 and one surface of the master cylinder 30 are affixed and sealed. Plural opening and closing valves 43 are provided in the vertical part 41 of the hydraulic control unit 40. The hydraulic pump 44, the motor 45, and the auxiliary reservoir 49 are provided in the horizontal part 42.

15 Claims, 8 Drawing Sheets

HYDRAULIC BRAKE CONTROL DEVICE

BACKGROUND OF THE INVENTION

This invention relates to a hydraulic brake control device applicable to a brake pressure control system such as an anti-lock brake system (ABS), or a traction control system (TCS).

In conventional devices, a master cylinder is generally mounted on the firewall within an engine compartment of the vehicle adjacent a location of a strut housing. Further, a steering column shaft is often located closely nearby. Thus, the available space for the master cylinder and related structure is very tightly limited. Accordingly, a hydraulic control unit is generally separately located from the master cylinder with the master cylinder and the hydraulic control unit being connected by a brake fluid pipe or hose.

Further a hydraulic brake control device integrating a master cylinder with a hydraulic control unit has been disclosed, for example, in the Japanese Patent Publication Numbers Heisei 8-282459 and Heisei 8-2391.

In these conventional devices, the hydraulic unit comprising a housing block, a pump mechanism, a valve mechanism, and fluid passages in a portion of the housing block, and a motor for pumping operation are mounted in the engine compartment. However, the integrated unit may not be employed when, as described above, the strut housing projects too closely to the master cylinder within the engine compartment or there is an interference with the steering column shaft.

OBJECT AND SUMMARY OF THE INVENTION

This invention is provided to improve the above described points.

To that end, an object of the invention is to provide a hydraulic brake control device with an effective ease of assembly.

A hydraulic brake control device according to the present invention comprises a hydraulic control unit integrated with a master cylinder and a hydraulic circuit with two line systems formed between the master cylinder and plural wheel cylinders, wherein a housing of the hydraulic control unit is L-shaped in cross-section, one surface of the master cylinder is sealed fluid tight to one part of the housing of the hydraulic control unit, a plural number of opening and closing valves are provided in that one part of the housing of the hydraulic control unit, and an auxiliary pressure source is provided at the other side of the housing of the hydraulic control unit.

The hydraulic brake control device can have the hydraulic control unit located separately spaced apart from the installment flange which mounts the master cylinder to the tirewall.

The hydraulic brake control device can have the hydraulic control unit and an electronic control unit for the valves be integrated.

The hydraulic brake control device can also have an auxiliary reservoir for the auxiliary pressure source integrated with a part of the hydraulic control unit.

One side of the housing of the hydraulic control unit of the present invention can be affixed, via a sealing material, to the one surface of the master cylinder by a bolt.

A cushion or vibration absorber can be placed between the other side of the housing of the hydraulic control unit and the bottom of the master cylinder in the present invention.

The hydraulic brake control device can have the master cylinder be a tandem type with two fluid chambers. In such case, an opening and closing valve of each line system is connected to one fluid chamber provided at the side of the every fluid chamber within a tandem-shaped master cylinder. A fluid passage can be formed between the opening and closing valves of each line system and the respective one of the fluid chambers of the master cylinder.

The plural number of opening and closing valves can be provided at the vertical part of the hydraulic control unit, and the auxiliary pressure source can be provided at the horizontal part of the hydraulic control unit. Alternatively, the plural number of opening and closing valves is provided at the horizontal part of the hydraulic control unit and the auxiliary pressure source is provided at the vertical part of the hydraulic control unit.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF PREFERRED EMBODIMENTS

Figure 1:
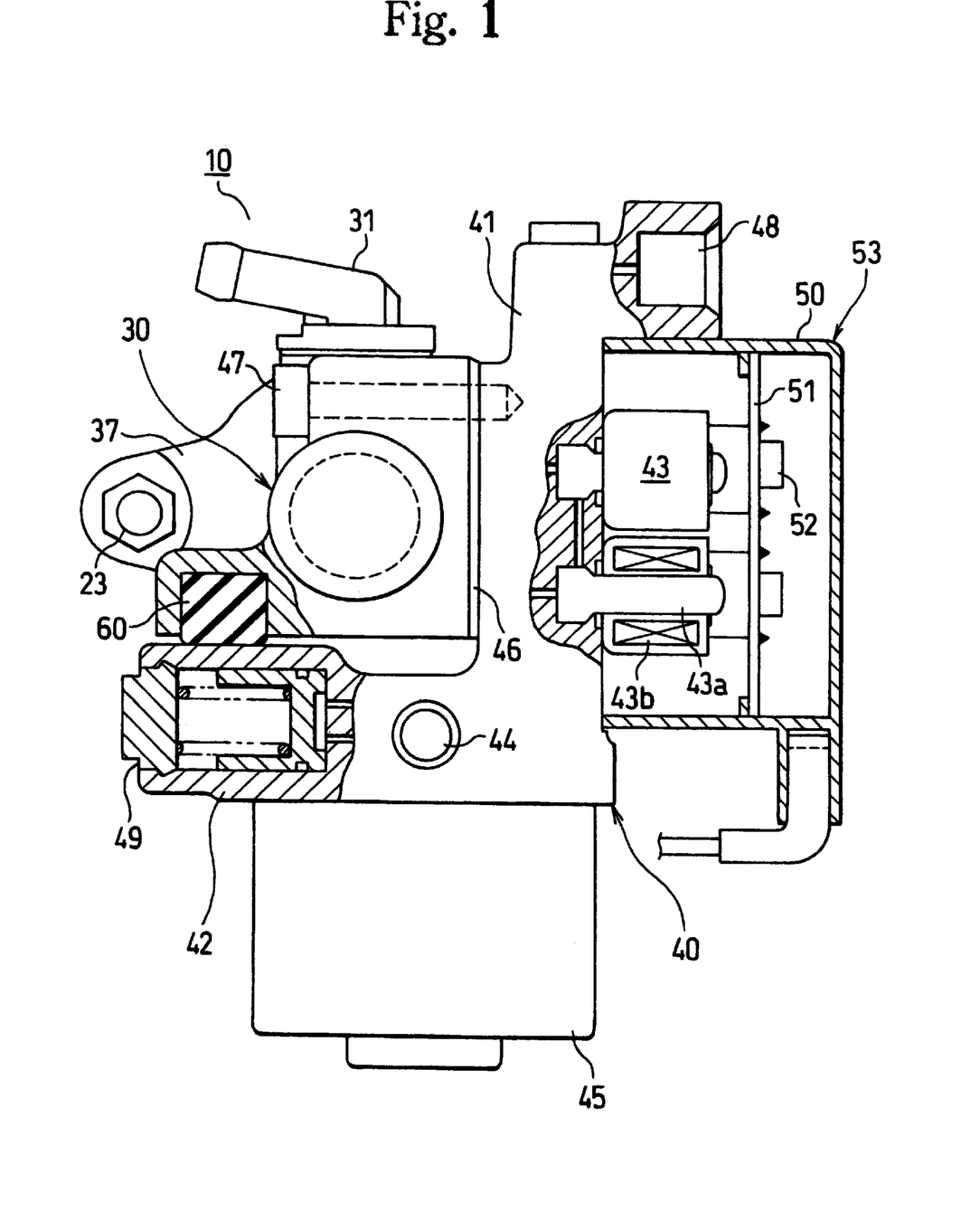
FIG. 1 is a front view of the hydraulic brake control device of the first embodiment according to the present invention.
Figure 2:
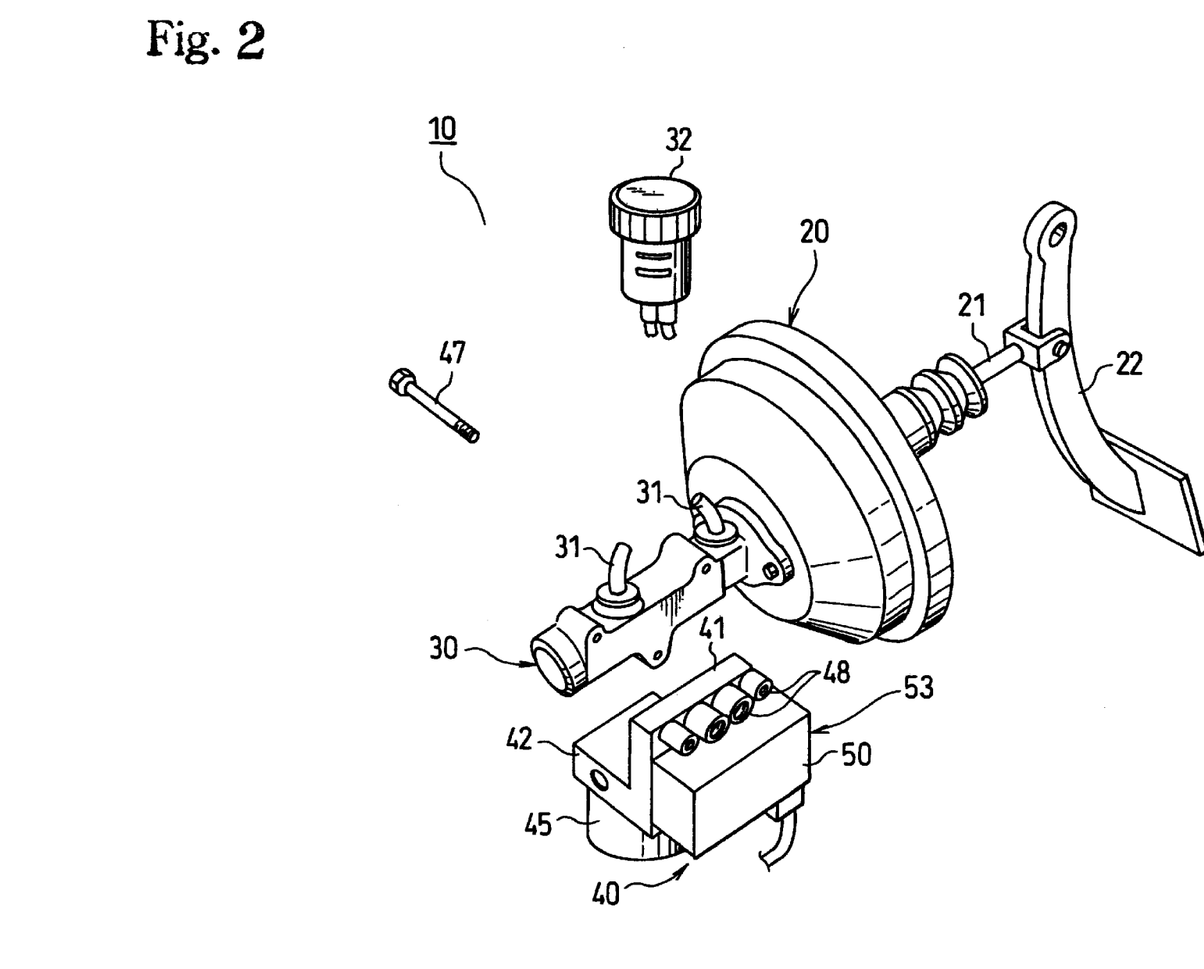
FIG. 2 is an exploded assembly view thereof.
Figure 3:
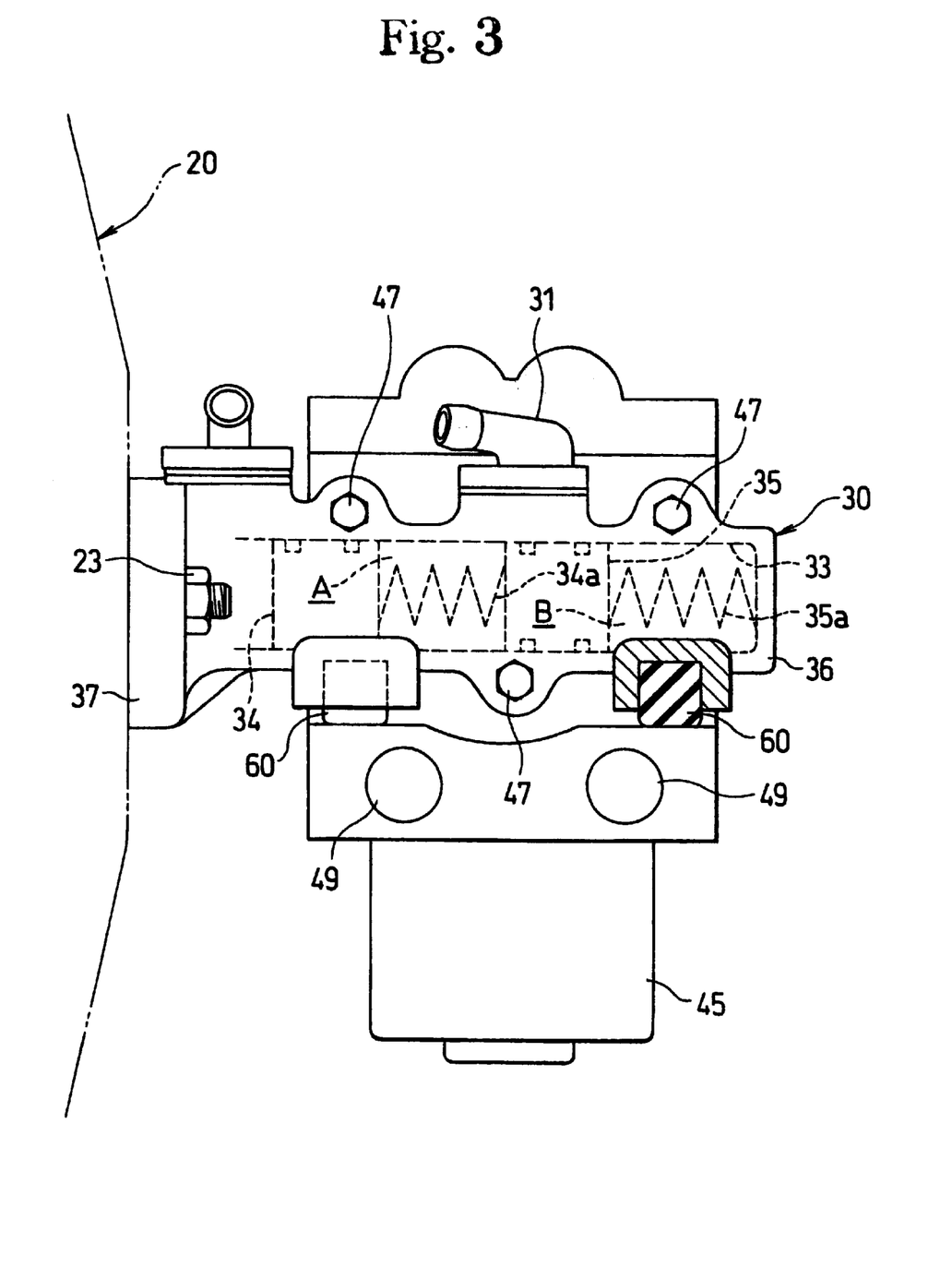
FIG. 3 is a left side view thereof.
Figure 4:
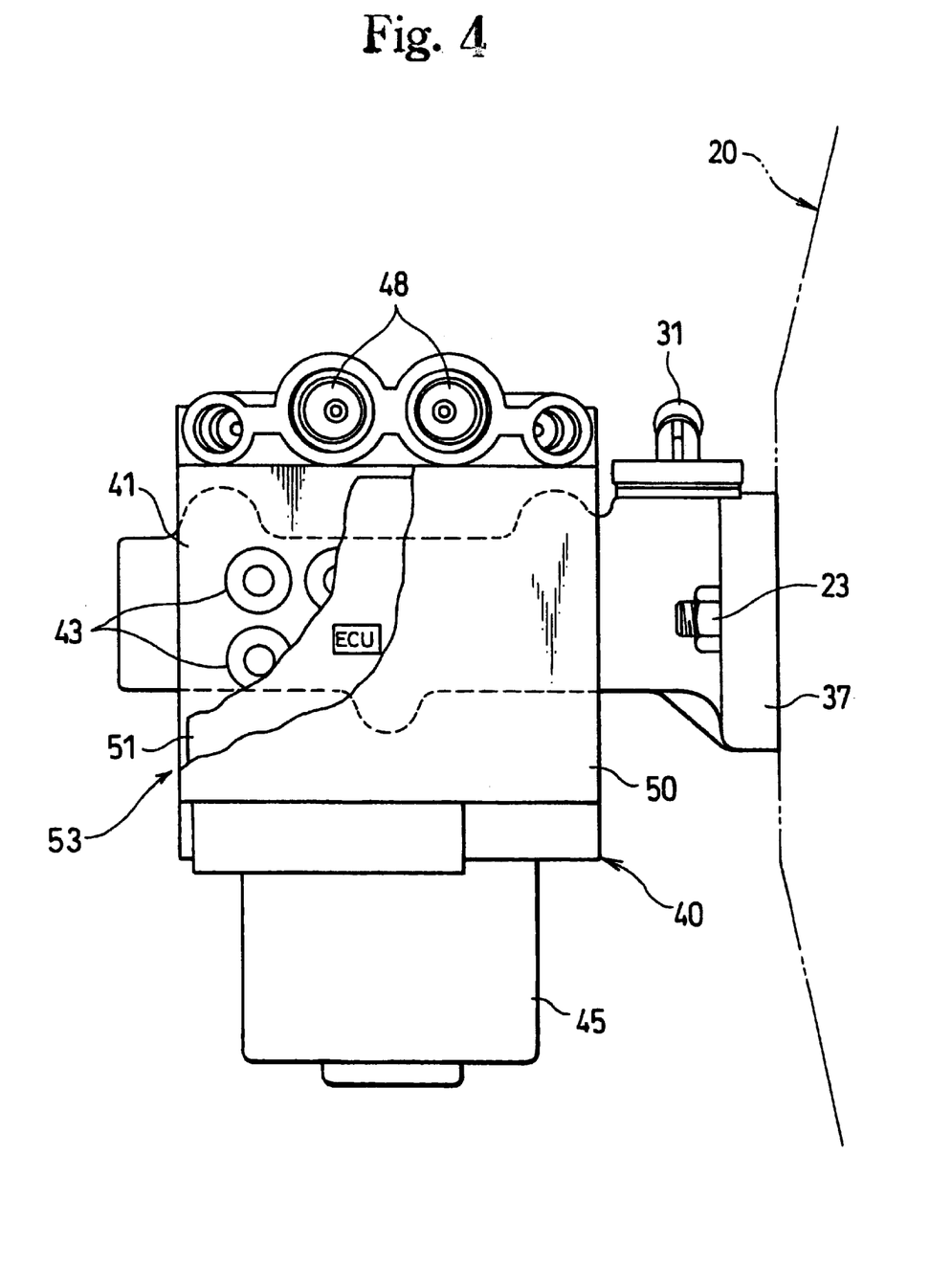
FIG. 4 is a right side view thereof partially cut away.
Figure 5:
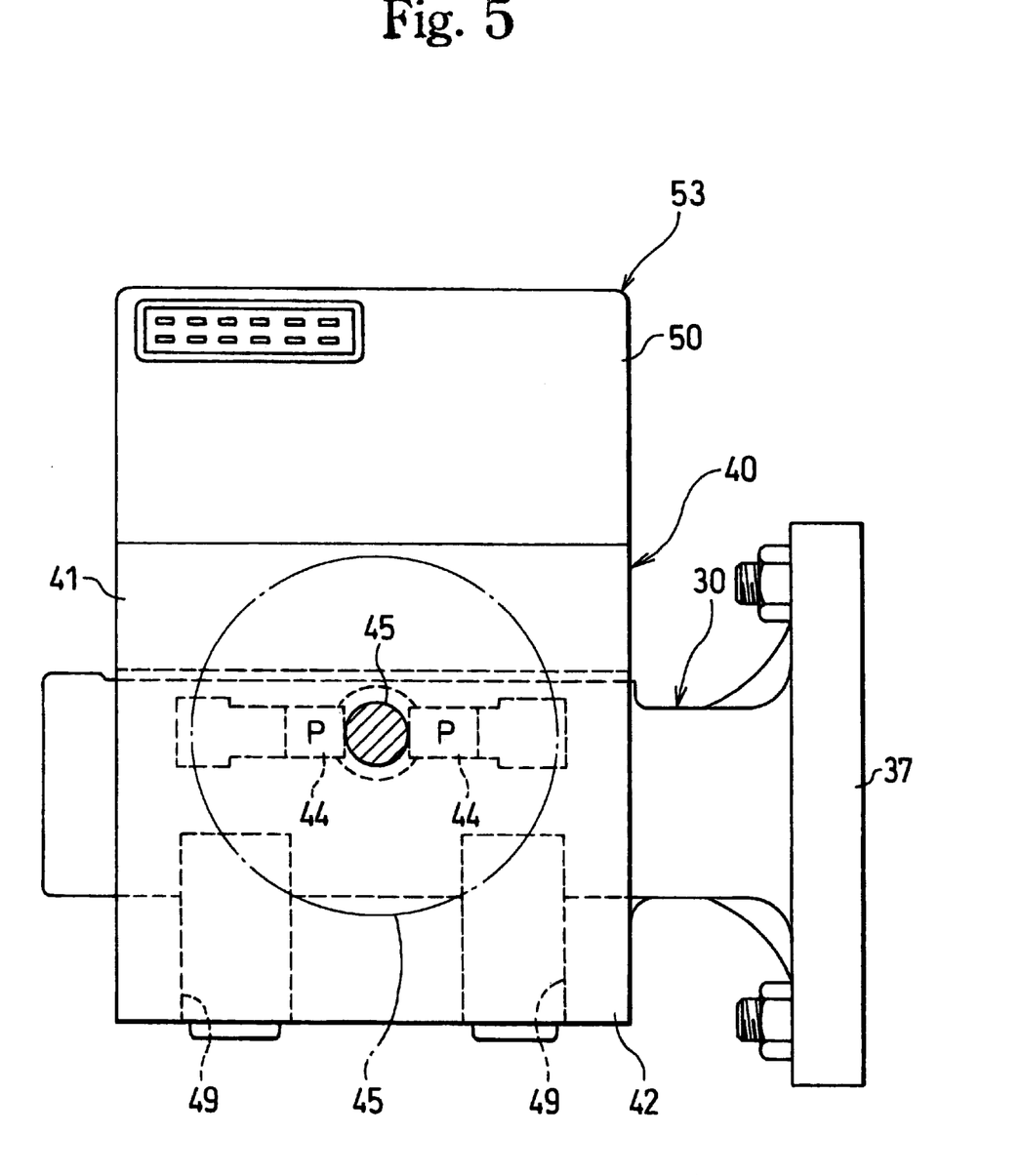
FIG. 5 is a bottom surface view thereof.

The first embodiment of the invention is explained with reference to FIGS. 1–5 wherein FIG. 1 is a front view, FIG. 2 is an exploded assembly view, FIG. 3 is a left side view, FIG. 4 is a right side view partially cutaway, and FIG. 5 is a bottom surface view of the hydraulic brake control device 10.

As shown in FIG. 2, the hydraulic brake control device 10 includes the brake power assist unit 20, the master cylinder 30 affixed to the brake power assist unit 20, and the hydraulic control unit 40. The housing of the hydraulic control unit 40 is formed in an L-shape in cross-section and is affixed to one surface of the master cylinder 30 with a fluid seal. Connection openings 31, 31, which lead to an inner part of the fluid chambers, are formed on the upper surface of the master cylinder 30. The connection openings 31, 31 are connected to the main reservoir 32 via hydraulic hoses or pipes or directly connected to the main reservoir 32.

The brake power assist unit 20 is generally affixed to a stationary part of the engine compartment such as the firewall at the rear of the dashboard (not shown in the diagram). As shown in FIG. 2, the power assist unit 20 is connected with the brake pedal 22 via the input shaft 21 and is designed to magnify the stepping force from the pedal 22 through the input shaft 21 and to transmit the magnified force to the master cylinder 30.

As shown in dotted lines in FIG. 3, pistons 34, 35 and springs 34a, 35a are installed in the bore 33 in the housing 36 of the master cylinder 10. First and second fluid chambers A, B are formed in this manner between the housing 36 and the pistons 34, 35. The installation flange 37 is formed at the end of the housing 36 and is affixed to the brake power assist unit 20 by the bolt-nut 23. The magnified force from the brake power assist unit 20 is transmitted to the pistons 34, 35 via an output shaft (not shown) of the brake power assist unit 20.

As shown in FIGS. 1 and 3, the housing of the hydraulic control unit 40 is formed in an L-shape by a vertical part 41 and a horizontal part 42 when viewed in cross-section. However "vertical" and "horizontal" as used herein are not limited to strictly vertical and horizontal parts relative to a horizontal plane, but rather are used in this specification and the claims as a convenient manner of indicating the orthogonal relationship of the two portions.

A plural number of opening and closing valves 43 each having an opening and closing valve assembly 43a and a coil assembly 43b are provided at the vertical part 41 and the electronic control unit 53 includes a cover 50, and the control board 51 having various electronic components 52. At the horizontal part 42, an auxiliary pressure source includes the hydraulic pump 44, the motor 45, and the auxiliary reservoir 49. As shown in FIG. 1, a plural number of the opening and closing valves 43 is provided at the outer surface of the vertical part 41. The arm-shaped cover 50 covers the plural number of the opening and closing valves 43, and is attached to the vertical part 41, for example, by bolts. The control board 51 is provided inside the cover 50.

The electronic component 52, such as an ECU chip, is provided on the control board 51. Appropriate wiring or the like connector electrically connects the control board 51, the respective opening and closing valves 43, and the motor 45. The connector can be formed at one part of the cover, and a harness may be connected with the connector. Further, the number of the above described opening and closing valves 43 is determined considering the type of the hydraulic control system selected.

The opposite surface of the vertical part 41 relative to the surface with the opening and closing valves 43 is flat and is affixed with a surface of the master cylinder 30 by installation bolts.

Sealing material or member 46 is positioned between the master cylinder 30 and the vertical part 41, which provides a high sealing effect.

As shown in FIG. 3, three portions of the master cylinder 30, two portions of the upper part and a lower central portion are affixed by bolts 47 to the vertical part 41. However, the location and the number of the bolts 47 are not limited to those as shown in the drawings.

In FIG. 4, a plural number of ports 48 of the hydraulic control unit 40 are formed at the side surface of the vertical part 41. Each port 48 and a wheel cylinder of one wheel are connected with a brake fluid pipe (not shown in the diagram).

Two hydraulic pumps 44, 44 are provided within the horizontal part 42 in line with each other. The motor 45 driving the pumps 44, 44 is provided on the lower surface of the horizontal part 42. The rotating driving shaft 45a of the motor 45 is shown in FIG. 5.

The auxiliary reservoirs 49, 49 are formed together in the horizontal part 42 as shown in FIGS. 1, 3, 5, and 8.

Inside the vertical part 41 and the horizontal part 42, fluid passages are provided between each of the fluid chambers A, B of the master cylinder 30 and the opening and closing valves 43, between the opening and closing valves 43 themselves, and between the opening and closing valves 43 and each port 48. Accordingly, the hydraulic circuit with two line systems connecting between the master cylinder 30 and the wheel cylinders can be provided as needed. Conventional circuits may be used in the hydraulic circuit with two line systems, and therefore, the explanation thereof is omitted here.

In addition, since the hydraulic control unit 40 is installed separately spaced apart from the installation flange 37 of the master cylinder 30, sufficient workable space may be provided between the hydraulic control unit 40 and the installation flange 37. This facilitates the dismounting of the master cylinder 30 from the brake power assist unit 20.

Figure 6:
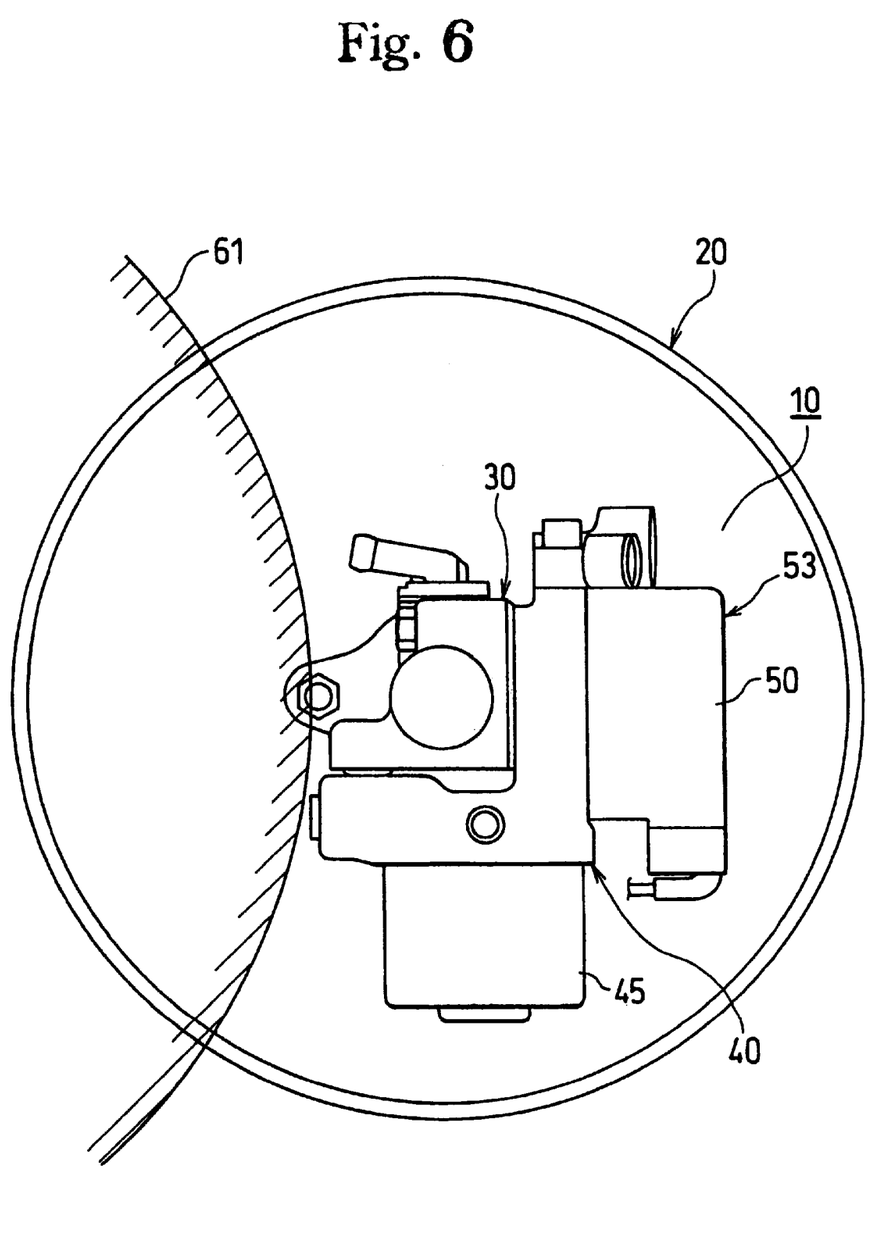
FIG. 6 explains the assembly thereof showing a front view with a potential left side interfering structure.
Figure 7:
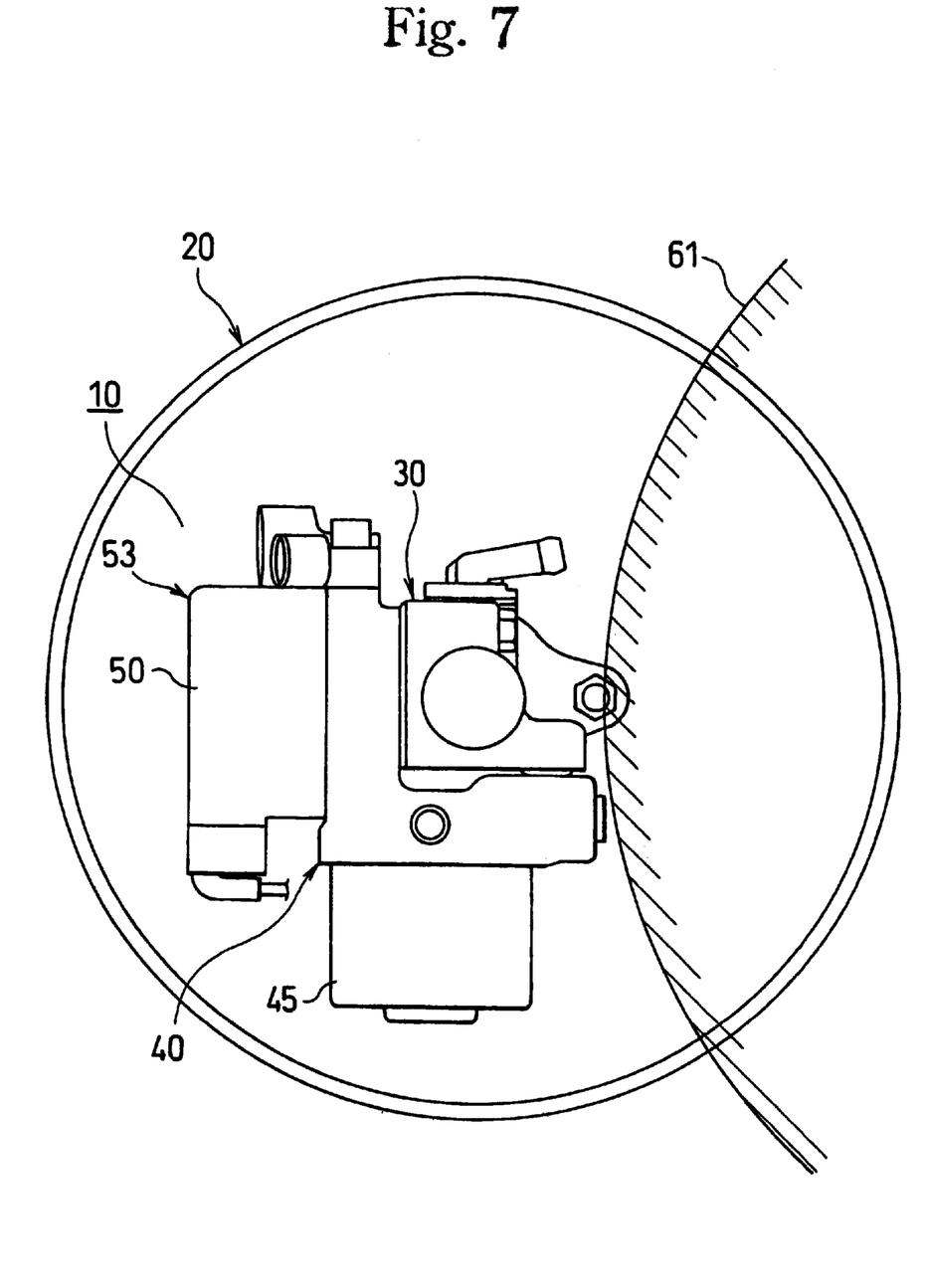
FIG. 7 explains the assembly thereof showing a front view with a potential right side interfering structure.

The hydraulic control unit 40 and the electronic control unit 53 are located to one side (right side in FIG. 6 and left side in FIG. 7) of the master cylinder 30, so that a protuberance into the space opposite to that side is eliminated. Therefore, the hydraulic control unit 10 may be mounted even if another part 61 (such as a strut housing), shown as a hatched area in each of FIGS. 6 and 7, exists. When the another part 61 is located at the right side viewing from the front of the master cylinder 30, the hydraulic control unit 10 may be located at the left side of the master cylinder 30. When the another part 61 is located at the left side viewing from the front of the master cylinder 30, the hydraulic control unit 10 may be located at the right side of the master cylinder 30.

The hydraulic control unit 40 is affixed on one surface of the master cylinder 30 with a plural number of bolts 47. Therefore, the vibration occurring when the motor 45 of the hydraulic control unit 40 operates, may be transmitted to the firewall or dashboard via the master cylinder 30. Consequently, as shown in FIGS. 1 and 3, one or more cushion members 60 or vibration absorbers made of a material such as rubber may be placed between the horizontal part 42 of the hydraulic control unit 40 and the master cylinder 30, so that the vibration of the motor 45 during operation might be relieved. The cushion 60 may also effectively relieve the vibration of the hydraulic control unit 40 and the master cylinder 30 occurring during the operation of the vehicle. The cushion 60 may be located as a part of either the horizontal part 42 or the master cylinder 30.

In FIGS. 3 and 4, when an operator steps on the brake pedal (not shown in the diagram), the stepping force is magnified via the brake power assist unit 20. The magnified force is transmitted to the master cylinder 30. The pressure generated in the respective fluid chambers A, B within the master cylinder 30 is transmitted to the ports 48 of the vertical part 41 via the appropriate fluid passages within the hydraulic unit 40. The fluid pressure from each of the respective ports 48 is transmitted to the respective wheel cylinder via the brake fluid pipes.

In the case of the vehicle skidding, a signal showing the tendency of the wheels being locked, is input to the electronic control unit 53. When the electronic control unit 53 recognizes the need of the skid control of the brake pressure, the respective opening and closing valve 43 and the motor 45 are operated to start the skid control operation (i.e., the pressure reduction mode, pressure holding mode, pressure increase mode), and the braking force of the respective wheel is properly controlled.

Various modifications are possible and are contemplated as being part of the present invention. The ports 48 may be placed on the lower surface or on a plural number of surfaces of the vertical part 41 in addition to the configuration shown with the ports 48 on the upper surface of the vertical part 41.

Figure 8:
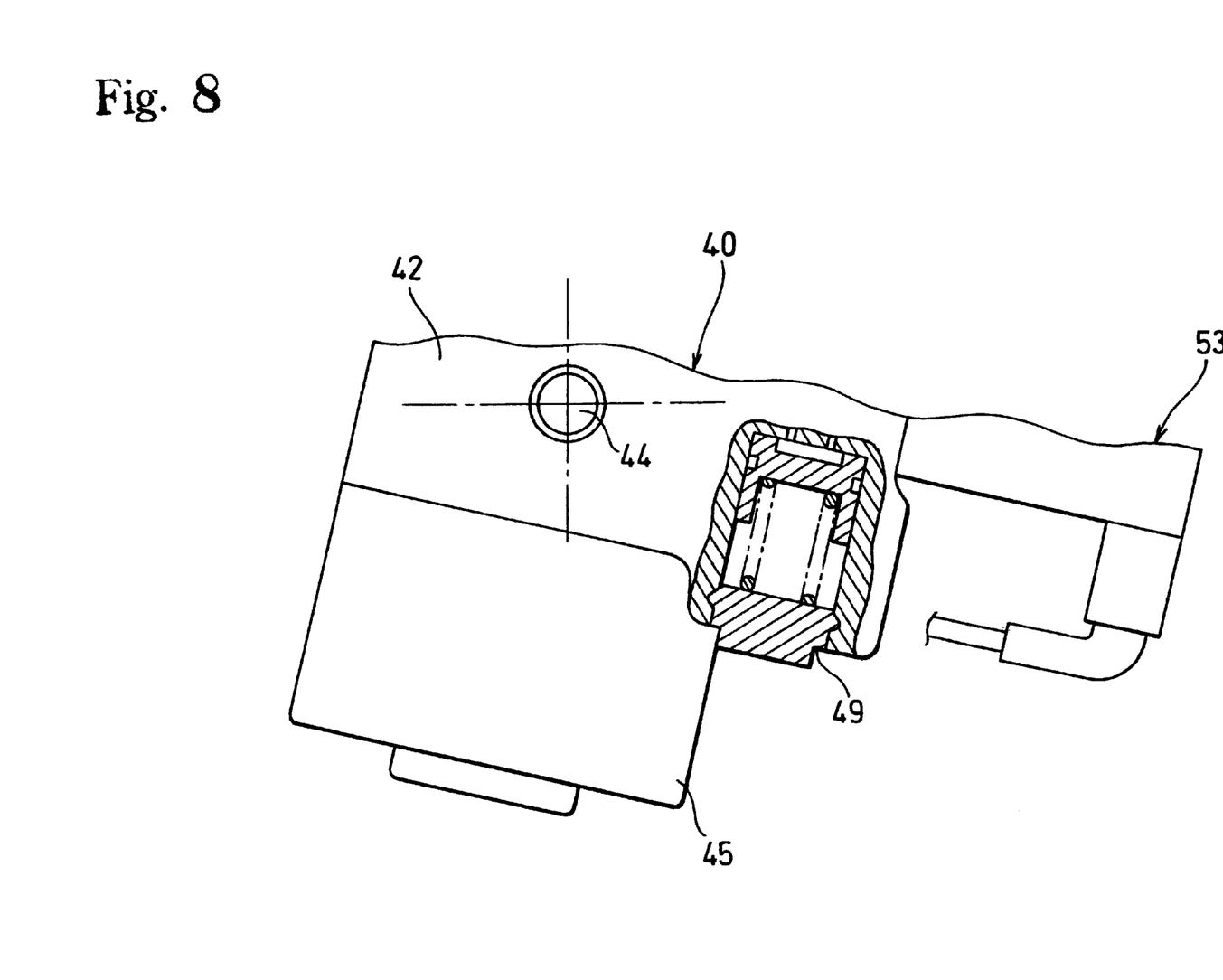
FIG. 8 is a partial cross-section view of a second embodiment of part of the hydraulic brake control device.

The above-described first embodiment sets forth the example where the auxiliary reservoir 49 is placed in the side of the horizontal part 42. However, the auxiliary reservoir 49 may be placed extending vertically in the horizontal part 42 as shown in FIG. 8. Alternatively, a separate auxiliary reservoir 49 may be provided for the horizontal part 42.

The above-described first embodiment sets forth the example where the electronic control unit 53 is installed at the vertical port 41 together with the hydraulic control unit 40 (i.e., an integral type). However, the electronic control unit 53 and the hydraulic control unit 40 maybe installed separately (i.e., a separate type). In such a case, the cover 50 would function solely as a protective cover of the opening and closing valves 43.

As opposed to the above-described first embodiment, the auxiliary pressure source (the hydraulic pump 44, the motor 45, and the auxiliary reservoir 49) may be provided in the vertical part 41, at the side of the hydraulic control unit 40. In such a configuration, the plural number of opening and closing valves 43 and the electronic control unit 53 may be provided on the bottom surface side of the horizontal part 42.

Generally, the hydraulic circuit with two line systems comprises functioning devices such as a pair of the opening and closing valves (an inlet valve and an outlet valve), a pair of the hydraulic pumps 43, and a pair of the auxiliary reservoirs 49. In such a case, those functioning devices are placed on the side surface or on the lower surface of the first fluid chamber A side and the second fluid chamber B side of a pair of master cylinders 30 compatible with each line system. In this manner, the length of the fluid passages might be shortened and the fluid passages might be formed parallel to or in the direction of crossing the master cylinder 30. This facilitates the assembly and design of the fluid passages and therefore reduces the cost of manufacturing the device.

This invention is as explained above and has the following effects.

(A) A hydraulic control unit with the L-shaped housing is integrated with the master cylinder, which creates sufficient space at the other side of the master cylinder. Accordingly, even if another part such as a strut housing exists at the general location of the master cylinder and only small space is left among other parts, an integral type of the hydraulic control unit with the master cylinder may be installed as the hydraulic brake control device of the present invention.

(B) A sufficient space is kept between a brake power assist unit and an installation flange of the master cylinder which facilitates the dismounting of the master cylinder.

(C) The functioning devices of the hydraulic circuit of the respective line system are provided at the fluid chamber side compatible to the respective line system of the tandem type master cylinder. Accordingly, the length of the fluid passages may be shortened. The design and layout of the device according to the present invention facilitates the assembly and also reduces the cost of the device.

(D) A sealing surface between the hydraulic unit and the master cylinder is the only sealing surface necessary, which eases the provision of a high sealing effect and improves the assembling processes.

(E) Since the respective line system of the hydraulic control unit is symmetrically located with respect to the axis which is perpendicular to the axis of the master cylinder, an identical hydraulic control unit may be used to be affixed to a master cylinder having the space at either the left or right side, simply by switching the type of master cylinder to have the appropriate right or left facing portion of the sealing surface of the master cylinder contact the surface of the vertical part.

Especially for left hand and right hand drive vehicles, where only differences are the locations of the operation controls such as the steering wheel and pedals, identical hydraulic control units may still be used. This eliminates the problem of increasing the number of different types of parts for the particular handed vehicles. This also facilitates the design of the device and reduces the cost of the device.

It is readily apparent that the above-described has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What we claim is:

1. A hydraulic brake control device comprising: a master cylinder, and a hydraulic control unit integrated with the master cylinder and equipped with a hydraulic circuit with two line systems formed between said master cylinder and plural wheel cylinders, wherein a housing of said hydraulic control unit is L-shaped in cross-section having two orthogonal parts, one surface of said master cylinder is sealed fluid tight to one part of said housing of said hydraulic control unit, plural opening and closing valves are provided in said one part of said housing of said hydraulic control unit, and an auxiliary pressure source is provided at the other part of said housing of said hydraulic control unit.

2. A hydraulic brake control device as claimed in claim 1, wherein said master cylinder has an installation flange for mounting, and said hydraulic control unit is located separately spaced apart from the installation flange.

3. A hydraulic brake control device as claimed in claim 1, wherein said hydraulic control unit and an electronic control unit for controlling said opening and closing valves are integrated.

4. A hydraulic brake control device as claimed in claim 2, wherein said hydraulic control unit and an electronic control unit for controlling said opening and closing valves are integrated.

5. A hydraulic brake control device as claimed in claim 1, wherein an auxiliary reservoir for said auxiliary pressure source is integrated with said other part of said hydraulic control unit.

6. A hydraulic brake control device as claimed in claim 2, wherein an auxiliary reservoir for said auxiliary pressure source is integrated with said other part of said hydraulic control unit.

7. A hydraulic brake control device as claimed in claim 3, wherein an auxiliary reservoir for said auxiliary pressure source is integrated with said other part of said hydraulic control unit.

8. A hydraulic brake control device as claimed in claim 4, wherein an auxiliary reservoir for said auxiliary pressure source is integrated with said other part of said hydraulic control unit.

9. A hydraulic brake control device as claimed in claim 1, wherein said one part of said housing of said hydraulic control unit is affixed, via a sealing material, to said one surface of said master cylinder by a bolt.

10. A hydraulic brake control device as claimed in claim 9, further comprising: a cushion between the other part of said housing of said hydraulic control unit and a bottom of said master cylinder.

11. A hydraulic brake control device as claimed in claim 1, wherein said master cylinder is a tandem-shaped master cylinder having two fluid chambers, opening and closing valves of each line system are connected to one of said fluid chambers and is provided at the side of said fluid chamber of said master cylinder, and wherein a fluid passage is formed between said opening and closing valves of each line system and the respective one of said fluid chambers of said master cylinder.

12. A hydraulic brake control device as claimed in claim 1, wherein said one part of said hydraulic control unit is an almost vertical part with respect to a horizontal plane and said other part of said hydraulic control unit is an almost horizontal part with respect to the horizontal plane, and said plural opening and closing valves are provided in said vertical part of said hydraulic control unit, and said auxiliary pressure source is provided in said horizontal part of said hydraulic control unit.

13. A hydraulic brake control device as claimed in claim 11, wherein said one part of said hydraulic control unit is an almost vertical part with respect to a horizontal plane and said other part of said hydraulic control unit is an almost horizontal part with respect to the horizontal plane, and said plural opening and closing valves are provided in said vertical part of said hydraulic control unit, and said auxiliary pressure source is provided in said horizontal part of said hydraulic control unit.

14. A hydraulic brake control device as claimed in claim 1, wherein said one part of said hydraulic control unit is an almost vertical part with respect to a horizontal plane and said other part of said hydraulic control unit is an almost horizontal part with respect to the horizontal plane, and wherein said plural opening and closing valves are provided in said horizontal part of said hydraulic control unit, and said auxiliary pressure source is provided in said vertical part of said hydraulic control unit.

15. A hydraulic brake control device as claimed in claim 11, wherein said one part of said hydraulic control unit is an almost vertical part with respect to an almost horizontal plane and said other part of said hydraulic control unit is a horizontal part with respect to the horizontal plane, and wherein said plural opening and closing valves are provided in said horizontal part of said hydraulic control unit, and said auxiliary pressure source is provided in said vertical part of said hydraulic control unit.

* * * * *